May 5, 1942.　　P. A. CULLMAN　　2,282,167

FLASHLIGHT

Filed Aug. 21, 1937　　　　4 Sheets-Sheet 1

INVENTOR.
Philipp A. Cullman
BY
ATTORNEY.

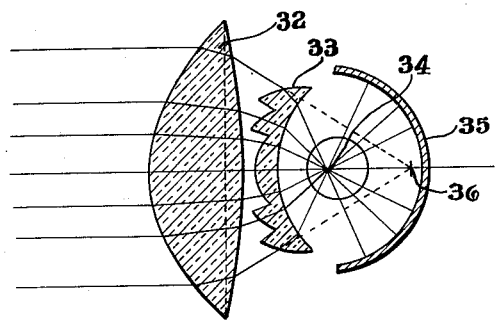
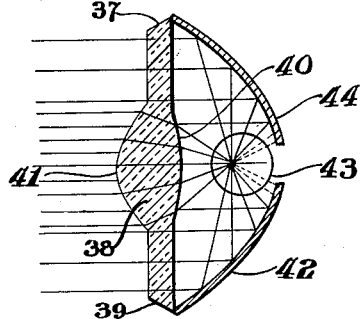
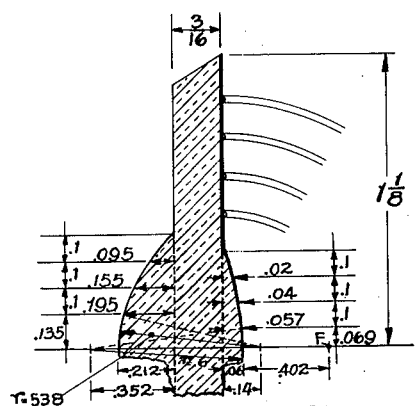
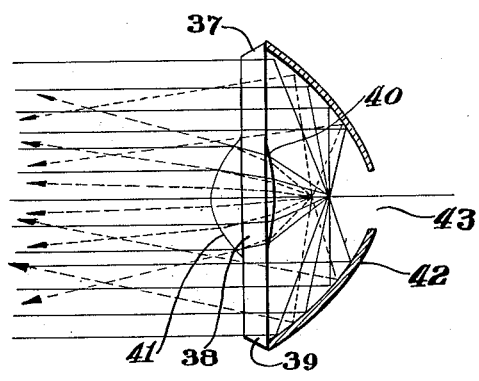
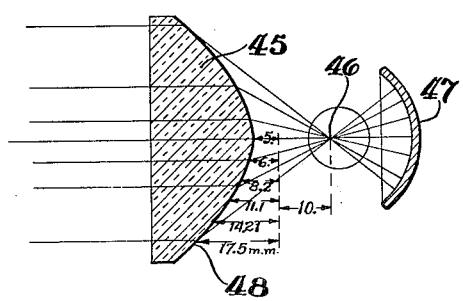
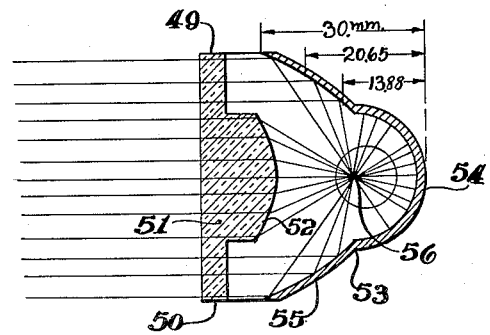

May 5, 1942. P. A. CULLMAN 2,282,167
FLASHLIGHT
Filed Aug. 21, 1937 4 Sheets-Sheet 3

INVENTOR.
Philip A. Cullman
BY
ATTORNEY.

May 5, 1942.    P. A. CULLMAN    2,282,167
FLASHLIGHT
Filed Aug. 21, 1937    4 Sheets-Sheet 4

INVENTOR.
BY
ATTORNEY.

Patented May 5, 1942

2,282,167

UNITED STATES PATENT OFFICE 2,282,167

FLASHLIGHT

Philipp A. Cullman, Flushing, N. Y., assignor to George M. Cressaty, New York, N. Y.

Application August 21, 1937, Serial No. 160,311

9 Claims. (Cl. 240—10.69)

This invention is directed to an improvement in flashlights and more particularly to an optical system for flashlights wherein substantially all the rays of light from the light source are gathered into the projected light beam and wherein the light beam is free from spherical aberration whether the light source be in the true focal position or out of such focal position in providing for beam adjustment.

The primary object of the present invention is to so construct the optical system for the flashlight as to efficiently utilize more light from the light source in a comparable sense with the conventional flashlight so as to materially and definitely increase the light intensity of the resultant beam without requiring an increase of power in the light source.

A further object of the invention is to provide an optical system in which the beam of light from the light source is so controlled and directed as to result in a greater concentration of light at the central part of the beam.

A further object of the invention is to provide an optical system for a flashlight in which the light from the light source is transmitted to and through the system in a manner to reduce to the extreme minimum the non-utilized light of such light source.

A further object of the invention is to produce an optical system in which the rays of light from the light source are projected into the beam in substantial parallelism one to the other.

A further object of the invention is to produce an optical system for flashlights with the rays of light from the light source so controlled and projected that the resultant beam produces a field of illumination which in all permissible focal positions of the light source is wholly and entirely free of striations or dark spots in the nature of non-illuminated sectors.

A further object of the invention is the production of an optical system for flashlights wherein the projected beam may be selectively controlled to present a light field of varying spread without in any way interfering with the constant beam distribution.

A further object of the invention is to produce an optical system for flashlights capable of control and adjustment for producing beams of light of relatively varying convergence and divergence while maintaining equal and even illumination under all permissible variations.

A further object of the invention is the production of an optical system for flashlights capable of control for producing a beam of light asymmetrical in cross section, with varying spread, while maintaining uniform illumination at all times.

A further object of the invention is to provide an optical system for flashlights wherein the lenses are not sensitively responsive to displacements of the light source from the true focal position and which are adjustable to selectively provide different types of beams while avoiding difficult and expensive construction.

A further object of the invention is the production of an optical system for flashlights constructed to permit first a variation in the spread of the symmetrical or parallel beam by adjustment on the optical axis and second to vary the shape and size of the asymmetrical or elliptical beam by adjustment at right angles to the optical axis.

A further object of the invention is the provision of an optical system for flashlights wherein provision is made for coloring the light beam.

The invention is illustrated in the accompanying drawings, in which:

Figure 6 is a view similar to Figure 5 wherein the condensing lens is of a modified type.

Figure 7 is a sectional view showing a modified form of optical system for the flashlight.

Figure 8 is a sectional diagrammatic view of the upper half of the lens of Figure 7 on a larger scale.

Figure 9 is a view similar to Figure 7 illustrating more particularly the lens control of the light rays when the light source is adjusted along the optical axis.

Figure 10 is a sectional view of an optical system made in accordance with the invention and illustrating a modified form of lens, Figure 11 is a sectional view of a modified optical system and modified reflector.

Figure 1:
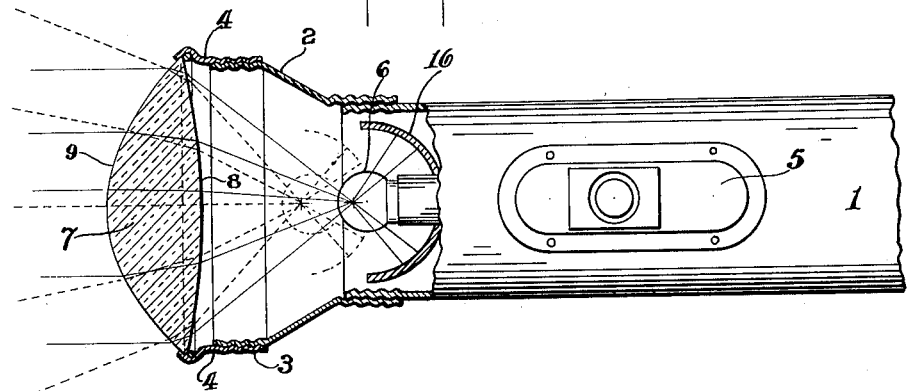
Figure 1 is a view in elevation, partly in section, showing a flashlight with a preferred form of optical system.

In Figure 1 of the drawings there is shown a conventional flashlight including a casing 1 having a flaring end 2 with an annular threaded band terminal 3 to receive a threaded lens carrier 4 and permit conventional adjustment of such carrier in the manner usual in adjusting flashlights. The casing 1 is provided with the usual light controlling switch 5 which is arranged as usual to energize the light source indicated at 6.

Figure 2:
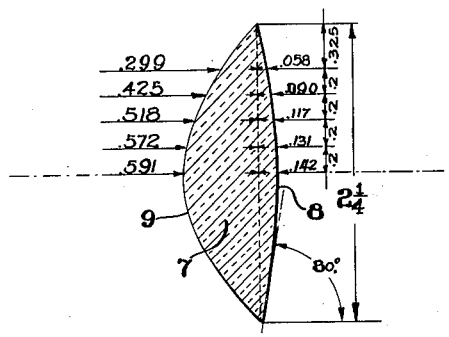
Figure 2 is a sectional view of the lens of the optical system shown in Figure 1.
Figure 4:
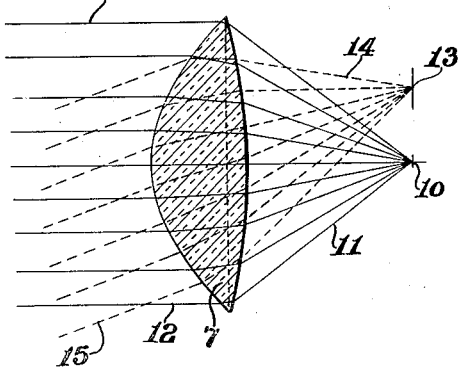
Figure 4 shows the lens of Figure 2 with the light ray projection from the light source in true focus and with the focal point offset at right angles to the optical axis.

The main lens, which is also illustrated in Figures 2 and 4, is constructed with a view to providing the maximum intensity from the light source, particularly where the filament is in the principal or outer focus. This lens, indicated at 7, has its inner and outer surfaces 8 and 9 of aspherical curvature. The horizontal measurements for these respective surfaces from a vertical line at right angles to the optical axis and joining the meeting edges of the respective curved surfaces at the margin of the lens are indicated in Figure 2, being given for the upper half of the lens only, the lower half of the lens being, of course, the same.

By reason of the particular curvature of the respective surfaces of this lens, the light rays, with the light source at the principal focus, will be refracted by the surfaces of the lens, so that the rays projected beyond the lens are parallel to the optical axis and free from any spherical aberration. Thus, the principal focus of the light rays of the lens is indicated at 10 and the projected beam rays at 12. The light source offset from the optical axis is indicated at 13 and the light rays 14 will be refracted by the surfaces of the lens, as indicated at 15 in Figure 14, to produce an asymmetrical or elliptical beam, as more clearly illustrated in Figure 17. Of course, if the light source offset from the optical axis is moved toward the lens, the result is an asymmetrical beam of wider spread, as will be obvious.

It will be noted that, as a result of the use of this lens, the paraxial rays and also the marginal rays are projected parallel to the optical axis which, of course, means that the lens is free of spherical aberration. Furthermore, as clearly obvious from Figure 1, the lens permits the adjustment of the light source along the optical axis from the principal focus toward the lens to increase the beam spread and it has been demonstrated by actual practice that an increase in beam spread of practically 30° can be obtained by maximum adjustment or a corresponding less spread by partial adjustment.

The lens is to be used with a reflector and, while obviously capable of use with various types of reflectors, is preferably in this type of flashlight construction used with a spherical reflector 16. The relative distances between the lens and light source along the line of the focal axis is, of course, obtained by adjusting the threaded connection of the band 3 and lens carrier 4, as is conventional. The displacement of the light source laterally of the focal axis may be obtained by various means such, for example, as shown in Figures 19 to 22 in one form and Figures 23 and 24 in another form, as will later appear.

Primarily this focal system permits wide variation of beam spread with constant illumination. There is no spherical aberration and two lines of adjustment are permitted, one in and out along the normal focal axis and the other up and down relative to such normal focal axis. These result in variations of the beam with the first adjustment varying the spread and producing a symmetrical or circular beam and the other varying the spread and producing an asymmetrical or elliptical beam.

Figure 3:
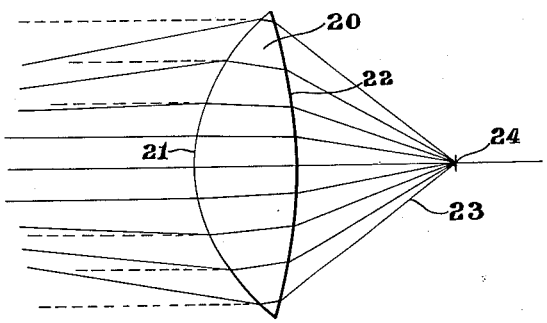
Figure 3 is a view in elevation illustrating a conventional form of lens with a view to demonstrating the projection of the light rays in comparison with the projection through the improved lens.

In order that the light control of the improved lens may be emphasized, there is illustrated in Figure 3 the utilization of a lens, indicated at 20, in which the surfaces 21 and 22 are both spherical. The rays 23 from the light source 24 in this figure will be so refracted by this type of lens that the rays adjacent the optical axis are projected beyond the lens in parallel relation while the rays beyond are focused at an angle to the parallel relation, the angular relation adjacent the margin of the lens being approximately 15°. This projection or substantial change of focus produces a spherical aberration and, while clearly resultant from a lens of the type shown in Figure 3 which is the conventional type, is entirely and completely avoided in the type of lens indicated in Figures 1, 2 and 4.

Figure 5:
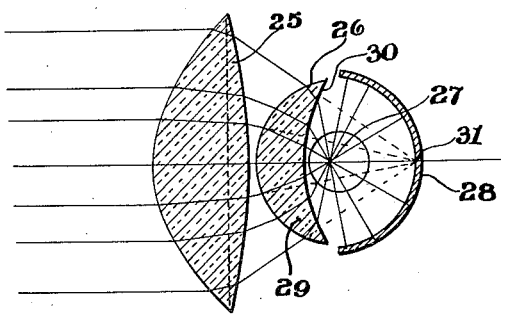
Figure 5 is a sectional view of a slightly modified form of optical system wherein the improved lens of the system is combined with a condensing lens.

In Figure 5 there is shown a lens of the type previously described and indicated generally at 25, with a condensing lens 26 between the light source 27 and the lens 25, the reflector 28 being of the spherical type. The condensing lens here shown has its outer surface 29 of an aspherical curvature while its inner surface 30 is of spherical curvature. Obviously the condensing lens materially shortens the focal length and increases the efficiency and light intensity by directing approximately 180° of the light rays through the main lens 25 incident to the shortening of the focus and by use of the reflector practically all of the remaining light rays are so reflected as to be directed through the main lens to thus render this particular modification of the system efficient in handling and utilizing practically all of the light from the light source. In this particular form the principal focus of the main lens without the condensing lens would be at 31, as indicated by the dotted outline in Figure 5.

Figure 6 is a similar view to Figure 5 except in a slight modification of the condensing lens. Here the main lens, indicated at 32, is of the form shown in Figures 1, 2 and 4. The concave stepped condensing lens 33 is of the doublet type and may be symmetrical or asymmetrical and with the shortened focus of the light source 34 and the spherical reflector 35, there is practically no light loss in the use of the system. In this figure, the principal focus of the main lens without the use of the condensing lens would be approximately at point 36, as indicated by the dotted lines, in order to secure the same result of light projection, though without the use of the condensing lens the volume of light from the light source utilized will be necessarily less than with the use of the condenser lens.

In Figures 7, 8 and 9 there is illustrated a modified form of main lens. The main lens, here indicated at 37, has a central lens section 38 and a marginal section 39 of plain clear glass. The central lens section is curved on both inner and outer faces 40 and 41. Each surface for a definite area surrounding the normal optical axis is of spherical curvature and beyond the spherical portions and intermediate said portions and the peripheral edges of the lens section the curved surfaces of the lens section are aspherical. Figure 8 illustrates by distance measurements and by radial lines the aspherical portions and the spherical portions of each of the lens surfaces. The full curved lens surface may, however, be fully spherical on both surfaces or fully aspherical. The inner lens surface may be larger than the outer surface, or of equal diameter with such outer surface. Again, the curved lens surface may be entirely on the inner surface of the lens, as in Figure 11, or entirely on the outer surface. This type of main lens is used with a parabolic reflector 42 and may, if desired, be provided with concentric flutings.

As indicated in Figure 7, the marginal rays from the light source are made parallel by the reflector and the lens section 38 refracts the paraxial rays to a concentrated beam. By this arrangement, practically all light rays passing through the main lens are made parallel. Through the use of the central lens section 38, the paraxial rays from the lamp source are focused into a beam instead of being uncontrolled and of little use as would be otherwise the case in the use of a parabolic reflector. This central lens section increases the light intensity in the central or axial area of the beam and at the same time makes the illumination of the beam of more uniform distribution.

If the central lens section is made just large enough to cover the lamp hole in the reflector, all the reflected rays will pass the edges in parallel path, but additionally there will be considerable light passing from the light source out to the side which is uncontrolled by either the lens or the reflector. To utilize more of these uncontrolled rays, the central lens section 38 is made larger than the opening indicated at 43 in the reflector through which the stem of the light source is passed. By this means the percentage of the total light controlled by the lens is considerably increased. However, by making the lens section 38 larger, a few of the reflected rays from that part of the reflector near the lamp hole are intercepted and diverted by the lens, but since the reflector area affected is comparatively very small, as it is close to the axis, the result is that the amount of light gained by the increase in size of the lens section 38 is in greater proportion to the entire light from the light source than the light diverted.

If it is particularly important to control this otherwise diverted portion of the light, the central portion of the parabolic reflector may be made spherical instead of on a parabolic curve. Under these circumstances, the rays striking the spherical part of this reflector are focused at the filament and pass to the lens which refracts them into a parallel beam. Thus, assuming that the annular portion of the reflector between the lines 44 is spherical, the reflection and refraction of the rays therefrom would be as indicated in dotted lines in Figure 7. As the result of experiment with a view to obtaining most efficient results, it is found that the lens of Figure 7 is of ideal construction and maximum efficiency where the central lens section 38 is of one-third the diameter of the complete lens.

The parabolic reflector subtends about twice the angle as the lens and, therefore, the light striking the reflector would be spread over a spot in the shape of an annular ring whose width is equal to the diameter of the spot formed by the lens. This results in a beam spot from the lens which illuminates an area substantially equal to one-third the diameter of the beam as a whole. The main reason for this proportion is to have the lens project a beam which compensates for the spot in the beam projection of the reflector particularly when the light is out of focus. The entire beam projection will then be of substantially uniform lighting throughout. In other words, with the central lens section substantially one-third of the complete lens, the illumination will be approximately even throughout the full light spot, as illustrated in Figure 16, where d and b show the beam from the reflector and c the beam from the lens.

Figure 16:
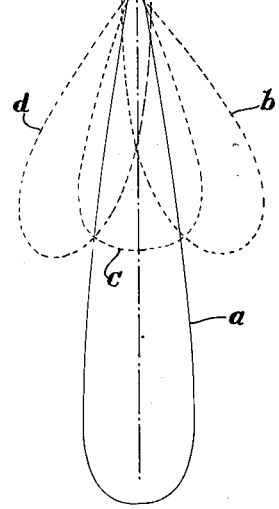
Figure 16 is a diagrammatic view illustrating the intensity of light distribution of the optical systems shown in Figures 7 and 9.

In Figure 9, the result incident to the adjustment of the light source relative to the lens on the normal optical axis is illustrated. Here the parts, numbered the same as in Figure 7, with the light source at the normal focal point, direct the light rays as indicated in Figure 7 and as shown in full lines in Figure 9. Where the light source is moved from the principal focus toward the lens, the light rays are diverged and spread out evenly in a cone, as indicated in Figure 16. The light rays which strike the upper portion of the reflector converge downwardly toward the optical axis, cross it and diverge on the opposite side, as indicated at b in Figure 16. The rays which strike the lower part of the reflector are directed across the optical axis and spread out above it, as indicated at d in Figure 16. The indication at a in Figure 16 shows the light distribution when the light source is at the principal focus.

Where the light distribution is as described when the light source and lens are relatively adjusted, there is, as is evident from Figure 16, an evenly illuminated field. If the central lens section 38 were omitted, the reflected beams which are directed across the optical axis would obviously form a circle of illumination with a large central unilluminated area or black spot. The addition of the lens section directs the light rays into this otherwise non-illuminated area, making the light field uniform.

The lens shown in Figure 7 presents the maximum insensitivity to the focal position of the light source. Thus, when the light source is out of focus, the paraxial rays produce a substantially parallel beam while the remaining rays are evenly divergent. Therefore, the unilluminated central area or black spot, which invariably results from the use of a parabolic reflector when the light source is out of focus, is completely and entirely eliminated as the field is uniformly lighted.

Figure 10 illustrates a further modification in that the optical system includes a main lens 45, a light source 46 and a spherical reflector 47. The lens has its inner surface 48 as a hyperboloid of revolution. Thus, this lens serves as a special form of aspherical curvature in which the field of illumination produced is intensified at the central or axial line and diminishes therefrom evenly toward the edges.

This particular lens has the advantage of flexibility in that the light source and its reflector may be moved toward or away from the lens for considerable distances to produce varied patterns of illumination. A hyperboloid lens as shown and described here is effective to produce a beam of high intensity at the central or axial point and without spherical aberration.

The modification illustrated in Figure 11 includes a main lens 49 constructed in its marginal portion as a plain flat glass section 50 and at its central portion and inwardly as a lens 51, the inner surface 52 of which is of hyperboloid section. The reflector, indicated at 53, is constructed to present a central spherical section 54 and a parabolic marginal section 55. The central lens section of Figure 11 is identical in effect with the central lens section of Figure 7, being constructed wholly interior rather than partly interior and partly exterior. The curvature varies to accommodate this arrangement. The lens of Figure 11 is slightly larger than one-third of the diameter of the lens body to cooperate with the increased diameter of the spherical section of the reflector.

In this type of optical system, with the placing of the hyperboloid lens close to the light source 56, such lens will pick up a large pencil of rays and refract them into a parallel beam. The rays directed to the parabolic section of the reflector are reflected outside the lens area through the flat plate section 50 of the lens. The spherical reflector collects substantially 180° of the rays lying in rear of the parabolic reflector section and reflects such rays to the filament for projection into the central beam.

Figure 12:
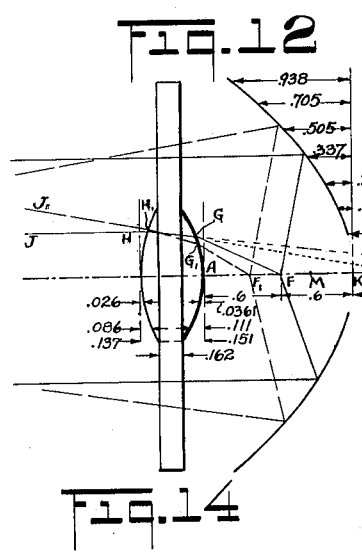
Fig. 12 is a diagrammatic view of a typical lens of the present invention showing the plotting of the parts of the lens.

Fig. 12 illustrates diagrammatically a typical lens of the invention, with the lines of curvature plotted and the detailed measurements of the parts indicated.

Figure 13:
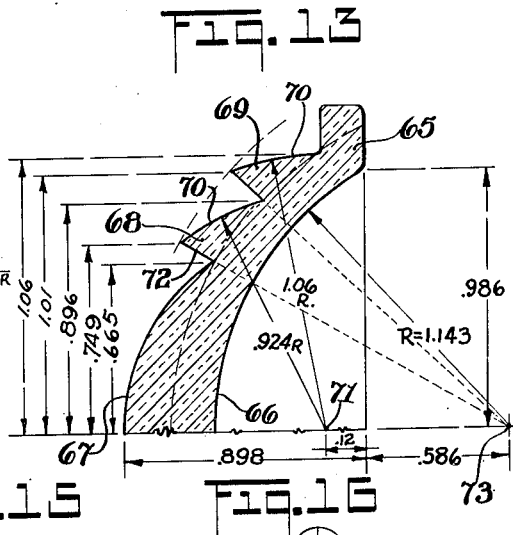
Figure 13 is a broken sectional view showing a further modification of the lens of the optical system.
Figure 14:
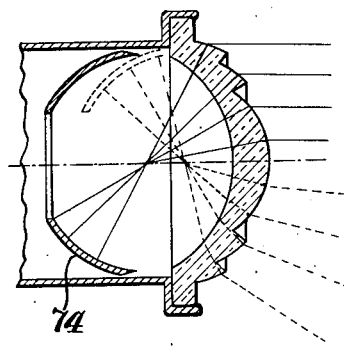
Figure 14 is a sectional view illustrating the use of the lens shown in Figure 13 in the optical system.
Figure 15:
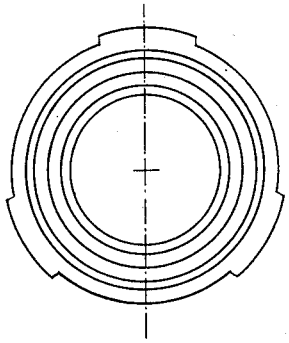
Figure 15 is a front elevation of the lens shown in Figures 13 and 14.

Figures 13, 14 and 15 illustrate a further modification wherein the main lens, indicated at 65, is of spherical form on its inner face 66 and has on its forward face a central lens section 67 of aspherical curvature approximating an elliptical contour. Beyond the central section, the outer face of the lens is formed as in two concentric stepped zones 68 and 69. The outer faces of these zones, indicated at 70, are of spherical form having a common center at approximately point 71. The radial faces 72 of these zones are on a line with the principal focus 73 of the lens and do not intercept any rays.

The aspherical face 67 of the central lens is of approximately elliptical contour, the eccentricity of which is the reciprocal of the refractive index of the glass used, and the face is so formed that the focus thereof coincides with the principal focus 73 of the lens system. Under these conditions, all the paraxial rays starting at the principal focus are rendered parallel by the central lens sector. The lens is used with a spherical reflector 74, as indicated in Figure 14, and the system is designed to accommodate a lamp of high intensity.

Figure 17:
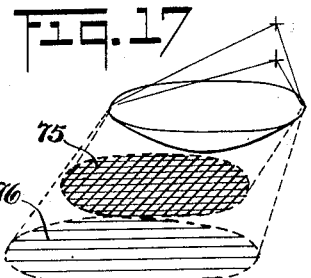
Figure 17 is a diagrammatic view illustrating the beam formed in the use of the lens illustrated in Figure 2, with the rays from the light source projected at an angle through the lens.
Figure 19:
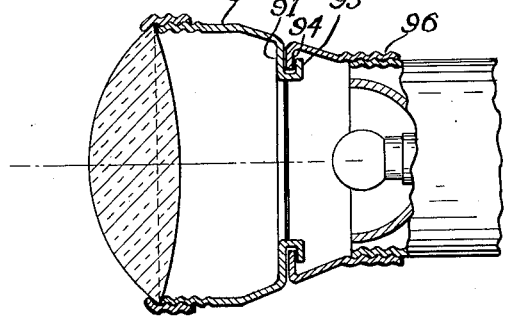
Figure 19 is a sectional view, partly in elevation, illustrating a means for transverse adjustment of the lens with respect to the light source.
Figure 20:
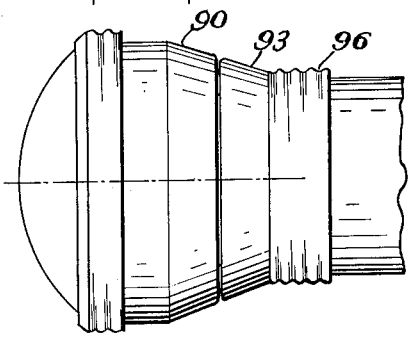
Figure 20 is an elevation of the same.
Figure 21:
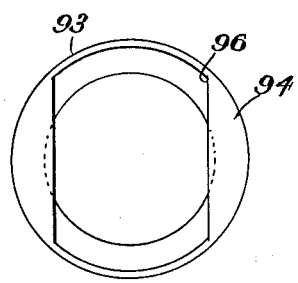
Figure 21 is a face view of the connecting element between the lens holder and the body of the flashlight.
Figure 22:
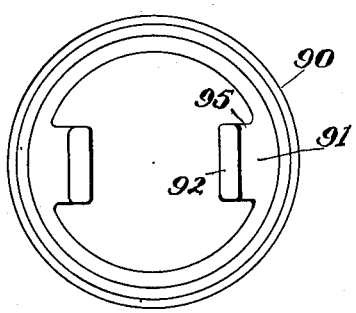
Figure 22 is a rear face view of the lens holder.

Figure 17 illustrates the application and use of the preferred form of lens shown in Figures 1, 2 and 4 where, through relative adjustment, the rays from the light source are projected at an angle to the lens to form the elliptical beam indicated at 75. The beam is composed of parallel rays but is of elliptical shape. When the light source is at the normal focal distance but off the optical axis, the elliptical beam, indicated at 75, is produced and when the light source is placed closer to the lens, a diverging beam is produced but still with an elliptical cross section, as indicated in dotted lines at 76 in Figure 17. It will, of course, be appreciated that this asymmetrical beam can be made of various spread dimensions depending upon the distance between the lens and the light source and could also be somewhat changed in shape, depending upon the degree of lateral offset of the light source from the optical axis.

Figure 18:
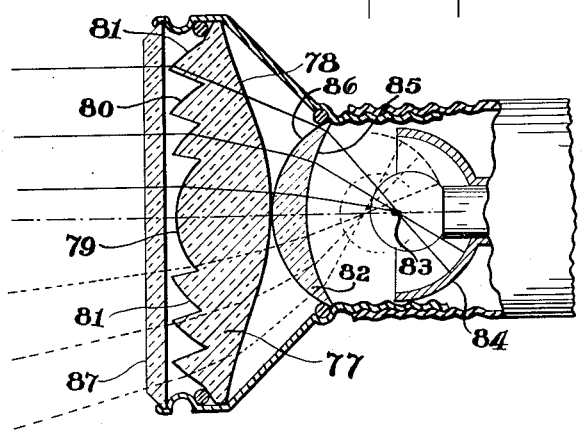
Figure 18 is a sectional view of an optical system with a modified main lens and a modified condenser lens.

In Figure 18 there is an optical system for flashlights having a main lens 77, the inner face 78 of which is of aspherical construction and the outer face of which is made up of a central spherical bullseye 79 with concentric refracting zones 80. Each of these zones has a surface 81 which differs in curvature in the respective zones and which are of spherical form on different radii with a center in the normal optical axis at a common point in the region of the normal focus of the lens. A condensing lens 82 is interposed between the main lens and the light source 83 and the latter is arranged in advance of a spherical reflector 84. The condensing lens has both inner and outer surfaces 85 and 86 of aspherical curvature.

The spherical aberration introduced into the lens system by the outer spherical surface is corrected by the proper design of the inner aspherical surface. Such a design should provide a central portion of relatively small radius of curvature which increases toward the edge of the lens. If the outer spherical surfaces have short radii of curvature, the correct aspherical inner surface will be convex in the central area and substantially concave in the marginal area. This inner surface has two points of inflection, where the curve changes from convex to concave curvature. If the outer spherical surfaces are designed with long radii of curvature, then the correcting inner aspherical lens will be approximately a hyperboloid of revolution, substantially resembling the inner surface of the lens shown in Figure 10. In this form of optical system, the spread of beam may be varied by relatively adjusting the reflector and light source and lens. This adjustment may be effected without loss of light and without any unilluminated area within the field. The system may include a protective glass plate 87 which may protect the lens system against breakage but may, if desired, be used, through appropriate coloring, to introduce a color effect in the beam.

In Figures 19 to 22, inclusive, is shown one form of means for providing for transverse adjustment of the lens with respect to the light source. In this form the lens holder, here indicated at 90, is formed at its inner margin and in diametrically opposed relation with flange extensions 91, the rear edges of which are turned inwardly and then outwardly at 92 to provide diametrically opposed channels, as indicated more particularly in Figure 22. The element or connector between the lens holder and body of the flashlight is formed on its forward edge with diametrically opposed inturned ledges or flanges 94 providing spaced parallel runways to seat in the channels formed on the lens holder as just described.

Obviously, the lens holder and lens carried thereby are thus mounted for a limited movement transverse the axis of the flashlight as a whole and of course, by properly proportioning the parts providing for this movement, the limit of this transverse movement may be readily determined. Through the transverse movement described, the lens holder and lens are shifted laterally of the axis with the effect to produce an elliptical beam of light.

Figure 23:
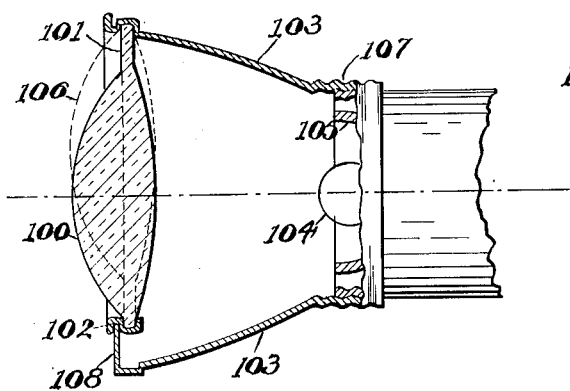
Figure 23 is a vertical sectional view, partly in elevation, showing another form of means for providing for transverse adjustment of the lens with respect to the light source.
Figure 24:
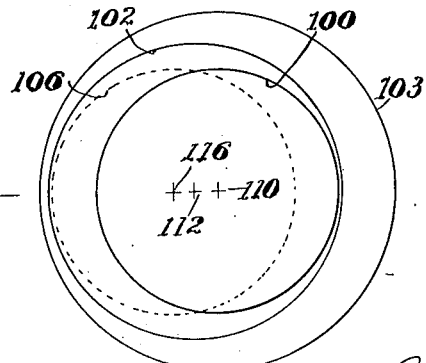
Figure 24 is a face view of the same.

A further construction for providing for transverse relative movement of the lens and source of light through a relative rotary movement of the parts is shown more particularly in Figures 23 and 24. Here the lens, indicated at 100, is provided on one side with a flat extension 101, the curved outer edge of the extension being struck from a different center from that of the lens proper. The lens is mounted in a channeled holder 102 fitted eccentrically in a plate element 108 which is secured to the end of the lens carrier 103, which latter is arranged for threaded connection at 107 with the lens body.

With the lens in the position shown in full lines in Figure 23, the axes of the light source 104 and of the lens proper 100 are in the same line, but when the element 103 is turned with respect to the body on the connection 107, the lens proper is shifted, as indicated in dotted lines in Figure 23 and also in dotted lines in Figure 24, with the result that the axis of the lens proper, normally at 112 in Figure 24, is shifted laterally with respect to the axis of the light source, resulting in a transverse adjustment for the purpose of producing an elliptical beam. That is, with the element 103 turned in one direction through 180°, the optical axis of the lens will be at 110, and when turned in the opposite direction the optical axis of the lens will be at 116.

While a detailed portrayal has been given of some of the forms the invention may take, not only in its optical characteristics but also its mechanical features, it is not intended to limit the invention to the above description. The nature of the invention is such that it may be used in connection with a multitude of different flashlights varying in size, shape, and different methods of mounting and adjusting the same or the lenses. The invention may be used in connection with a multitude of different lanterns, spotlights, or any other type of light projectors. Optical closures may be used or made of glass or any other transparent material. Various modifications, change or rearrangement of parts may be made, for instance—changes in angles or curvatures of the optical lens—in order to vary the light distribution or any other such alterations, without departing from the spirit of the invention and the scope of the appended claims.

What is claimed to be new is:

1. In a flashlight, an optical system therefor including a source of light and an adjustable unitary lens having a plurality of relatively-different aspherical surfaces, said lens being movable with respect to the light source for projecting a plurality of different light beams, one being a spotlight beam produced when the lens is in one position and another being a substantially uniform floodlight beam produced when the lens is in another position, and means for moving the lens with respect to the light source at right angles to the normal optical axis for providing a substantially laterally-elongated beam while maintaining an even field of distribution.

2. In a flashlight, an adjustable light source, means including a lens and a reflector for projecting differently distributed light beams, said lens comprising a central condensing lens portion surrounded by a relatively wide margin of flat glass, said means, including said adjustable light source in one position, projecting substantially parallel rays through said flat portion of the lens to produce an intensified spot beam, and said means, including said adjustable light source in another position, projecting diverging rays through said flat portion to produce a spread beam, the rays refracted by said condensing lens portion reenforcing the spot beam and the central area of said spread beam whereby a spread beam of substantially even distribution is secured.

3. A flashlight including an optical system having a lens, the respective faces of which include aspherical surfaces, a light source, the light source being normally in optical alinement with the lens, means for relatively adjusting the light source and lens along the optical axis, means for relatively adjusting the light source and lens a substantial distance in a plane normal to the optical axis, the curvature of the lens surfaces varying the contour of the projected beam and substantially avoiding spherical abberation in and out of normal alinement.

4. A construction as defined in claim 2 including a reflector for the light source, and further including the aspherical surfaces of the lens as differing one from the other.

5. A construction as defined in claim 3 wherein the respective aspherical surfaces of the lens differ one from the other and insure the increase of light spread while maintaining an even field of illumination under relative adjustments of the light source along the optical axis.

6. In a flashlight, an optical system including a source of light on the normal optical axis, a condensing lens, a reflector on said axis, and means permitting two lines of adjustment of a portion of the optical system forward of said light source, both operable at the will of the user, one normal to the optical axis and the other along said optical axis, whereby either a circular or an oval concentrated spotlight beam or a circular or oval enlarged flood light beam may be produced by manipulating said means.

7. In a flashlight, an optical system therefor for projecting a plurality of differently-distributed light beams, including spot light and floodlight beams, comprising a condensing lens formed in the center of a flat glass plate, a parabolic reflector behind said lens, and an adjustable light source normally at the focus of said reflector, the beam from the light source which is incident on said centrally-disposed lens being controlled thereby to reinforce uniformly the beam delivered by the parabolic reflector through the flat glass plate portion when the light source is at the principal focus of the reflector and to reinforce the center portion of the spread beam when the light source is in flood light position in said reflector.

8. A flashlight, an optical system therefor including a condensing lens surrounded by a margin of plane flat glass, a substantially parabolic reflector behind said lens, and an adjustable light source normally at the focus of said reflector, the conical beam from the light source which is incident upon the condensing lens being directed thereby to fill and illuminate the center of the beam delivered by the reflector through the flat glass margin when the source of light is moved forwardly from its normal position for spreading the beam of light.

9. In a flashlight, an optical system including a source of light and an adjustable unitary lens having a plurality of relatively-different aspherical surfaces, a mounting for the lens to permit lens adjustment to produce a spotlight beam or a substantially uniform floodlight beam according to the degree of such adjustment, the adjustment being in the line of the normal optical axis of the lens, the lens being mounted to permit another adjustment in lines normal to the optical axis to produce a laterally-elongated beam while maintaining the evenness of the field of distribution, the lens surfaces having such curvature as to vary the contour of the projected beam and substantially avoid spherical abberation.

PHILIPP A. CULLMAN.